No. 12,607. REISSUED FEB. 12, 1907.

J. A. RHOULT.

METHOD OF SEWING SHOE SOLES TO UPPERS.

APPLICATION FILED NOV. 18, 1905.

3 SHEETS—SHEET 1.

Witnesses:

Arthur F. Randall

Mary G. Hennessy

Inventor:

Joseph A. Rhoult by George A. Rockwell

Attorney.

THE NORRIS PETERS CO., WASHINGTON, D. C.

No. 12,607. REISSUED FEB. 12, 1907.

J. A. RHOULT.

METHOD OF SEWING SHOE SOLES TO UPPERS.

APPLICATION FILED NOV. 18, 1905.

3 SHEETS—SHEET 2.

Witnesses:

William T. Randall

Mary G. Hennessy

Inventor:

Joseph A. Rhoult by George A. Rockwell

Attorney.

THE NORRIS PETERS CO., WASHINGTON, D. C.

No. 12,607. REISSUED FEB. 12, 1907.

J. A. RHOULT.

METHOD OF SEWING SHOE SOLES TO UPPERS.

APPLICATION FILED NOV. 18, 1905.

3 SHEETS—SHEET 3.

Witnesses:

Arthur T. Randall

Mary G. Hennessy

Inventor:

Joseph A. Rhoult by George A. Rockwell

Attorney.

THE NORRIS PETERS CO., WASHINGTON, D. C.

UNITED STATES PATENT OFFICE.

JOSEPH A. RHOULT, OF HAVERHILL, MASSACHUSETTS, ASSIGNOR OF ONE-HALF TO HARRIS W. SPAULDING, OF HAVERHILL, MASSACHUSETTS.

METHOD OF SEWING SHOE-SOLES TO UPPERS.

No. 12,607. Specification of Reissued Letters Patent. Reissued Feb. 12, 1907.

Original No. 789,066, dated May 2, 1905. Application for reissue filed November 18, 1905. Serial No. 288,086.

*To all whom it may concern:*

Be it known that I, JOSEPH A. RHOULT, a citizen of the United States, and a resident of Haverhill, in the county of Essex and State of Massachusetts, have invented a new and Improved Method of Sewing Shoe-Soles to Uppers, of which the following is a full, clear, and exact description.

The object of the invention is to provide a new and improved method of sewing the soles of shoes, boots, and similar footwear to the uppers thereof by machinery without requiring the use of lasts for forming the uppers and allowing the uppers and soles to be sewed together without the use of insoles, doing away with the insoles, making the soles more flexible, materially lessening the weight of the shoe and preferably doing away with turning of the uppers, and thereby avoiding straining, cracking, or tearing the uppers.

The method consists in placing a completely-formed upper in juxtaposition to a sole, holding and guiding the upper with respect to the sole, and sewing the upper directly to the sole.

In order to carry this method into effect, I proceed in detail as follows, reference being had to the accompanying drawings, forming a part of this specification, in which similar characters of reference indicate corresponding parts in all the views.

Figure 1:
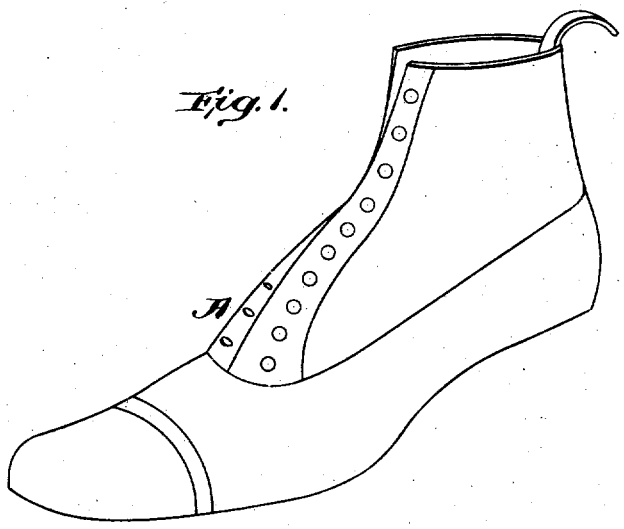
Figure 2:
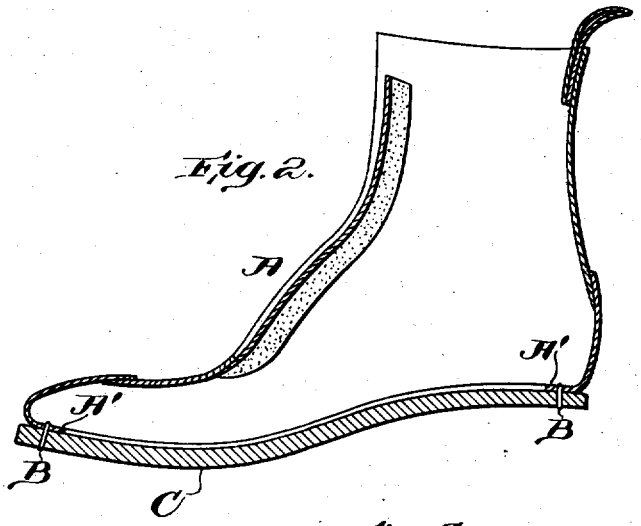
Figure 3:
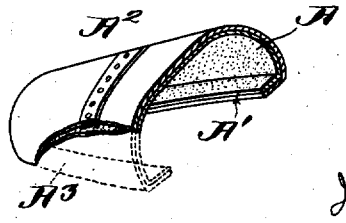
Figure 4:
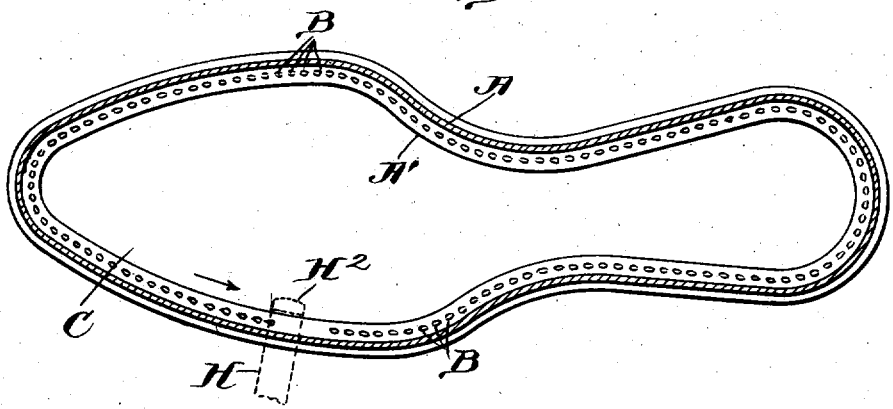
Figure 5:
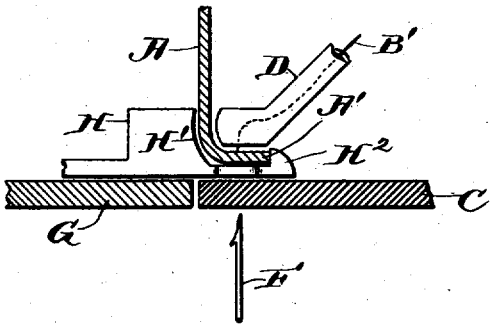
Figure 6:
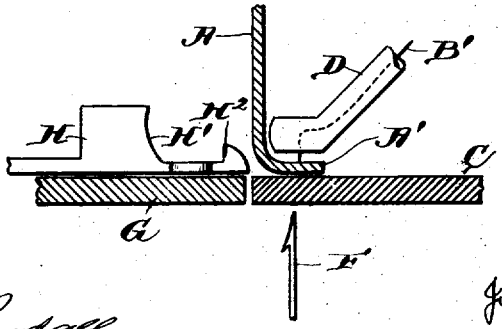
Figure 7:
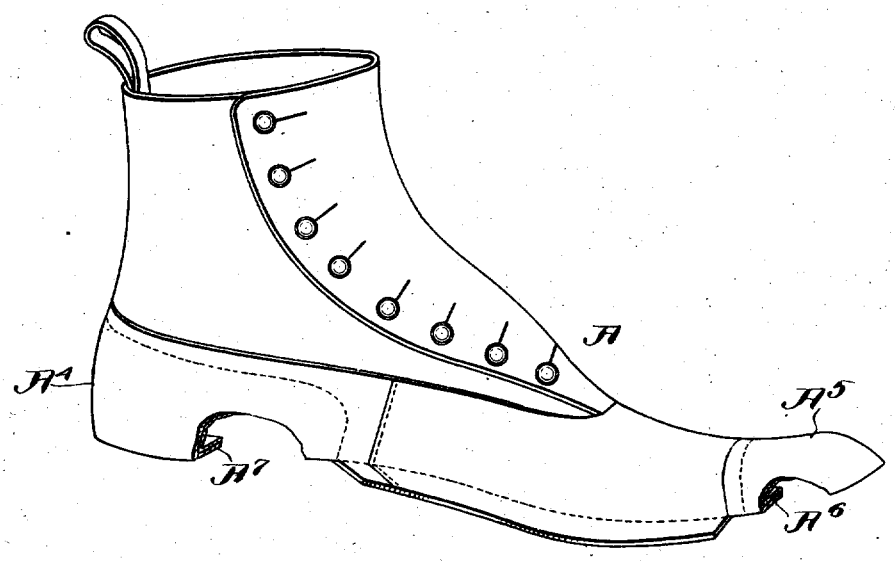

Figure 1 is a perspective view of the prepared upper. Fig. 2 is a longitudinal sectional elevation of a shoe made according to my method. Fig. 3 is a sectional perspective view of a box-toe. Fig. 4 is a sectional plan view of the sole while in process of sewing the sole to the upper. Fig. 5 is an enlarged transverse section of the preferred means employed for sewing the sole to the upper during the first period of the sewing. Fig. 6 is a like view of the same, showing the parts in position during the last period of sewing; and Fig. 7 is a perspective view, partly in section, of an upper having a molded box-toe and a molded heel portion.

In making shoes according to my method an upper A, preferably with an inturned annular flange A′, is sewed with the use of a sewing-machine and by a row of stitches B to the outer sole C without the use of an inner sole and preferably while the upper and sole are in their natural (not turned) positions. In order to accomplish the sewing, a suitable sewing-machine is provided, the one herein shown having a horn D, (see Figs. 5 and 6,) extending into the upper to engage the top of the flange A′, the horn D being hollow for the passage of the sewing-thread B′ and containing a revoluble looper for forming loops to be successively engaged by a needle F, passing through the sole C and the flange A′ to take hold of the sewing-thread loops and draw the same downward through both the flange A′ and the sole C to form stitches at the simultaneous forward feeding of the upper A and sole C. The upper edge of the sole C is guided opposite the needle along an abutment G, and in order to give and maintain the proper shape of the flange A′ of the upper A relative to the sole C a folder or guide H is provided extending between the top of the sole C and the under side of the flange A′, the folder having a side opening in its bottom for the passage of the needle F and the folder also having a guiding and folding shoulder or abutment member H′ for the side of the upper A at the junction of the side with the flange A′, the inner edge of which abuts against a stop $H^2$ on the said folder H. While the upper A and the sole C are intermittently fed along the abutment G and the folder H, with the horn D inside of the upper and the needle F reciprocating, then the row of stitches B is formed to unite the sole C to the flange A′. When the major portion of the stitches around the annular flange A′ and the edge of the sole have been made, then the first period of the sewing is ended, and during the second or last period of sewing it is necessary to withdraw the folder H from between the flange A′ and the sole C, (see Fig. 6,) and then the remaining stitches—say for about an inch in length—are made without the use of the folder H, the flange then being in direct contact with the sole C for the needle and sewing-thread B′ to properly sew this last portion of the flange A′ to the sole. The sewing-machine employed for doing the stitches in the two periods of time, as described, is in detail preferably of the construction as shown and described in the application for Letters Patent of the United States, Serial No. 191,929, filed by me under even date herewith. After the shoe has been sewed as described it can be readily taken from the machine, and then a shank is placed inside of the shoe and attached to the heel portion thereof with glue, paste, or other fastening means, and then the shoe is lasted and placed in a sole-leveling machine, and then the upper is smoothed with a hot iron tool.

From the foregoing it will be seen that by the method described the shoe is sewed without any last or inner sole, and yet the same shape is given to the shoe as it would have if a last were employed, and at the same time the upper A is not unduly strained, as is the case in the manufacture of shoes as now practiced and in which the upper is drawn over a last. Shoes constructed according to my method are hence not liable to crack or tear at the upper and at the same time a perfect fitting of the shoe is insured, as the upper is formed according to a perfect pattern, and the sole is directly sewed onto such prepared upper and without requiring the upper to be inside out during the sewing operation.

If it is desired to use a box-toe on the upper, then such box-toe $A^2$ (see Fig. 3) is completely prepared and sewed to the upper A, and the box-toe is formed with a flange $A^3$, sewed to the sole by the stitches B the same as the flange A′ of the upper. If shoes having stiffened toes and reinforced heel portions are to be produced, then the heel portion $A^4$ and the toe portion $A^5$ are each provided with a stiffener between the upper and the lining, (see Fig. 7,) and the upper thus prepared is then molded or formed to produce stiff inward flanges $A^6$ $A^7$ on the toe and heel portions, respectively, the vamp-flanges $A^8$ being left unmolded and formed subsequently in the sewing-machine when sewing the sole in place.

In practice I prefer to start the sewing at one side of the shoe, and when the stitches have reached within an inch of the beginning point of the stitches then the folder H is drawn out from under the flange A′, and the second or finishing period of stitching is then accomplished without the use of the folder, as previously explained.

It is to be understood that by the term "completely-formed upper" herein used I mean an upper in which all of its parts are united.

Having thus described my invention, I claim as new and desire to secure by Letters Patent—

1. The method of securing shoe-soles to uppers, consisting in placing a completely-formed upper with an inturned flange at the bottom in the natural or unturned position in juxtaposition to the sole, holding and guiding the flange of the upper with respect to the sole, and sewing the sole directly to the flange of the upper, as set forth.

2. A method of securing shoe-soles to uppers consisting in placing a completely-formed upper with an inturned flange at its bottom in the natural or unturned position in juxtaposition to the sole; sewing the upper directly to the sole and simultaneously utilizing the opening between the upper and the sole immediately in advance of the sewing for guiding the flange of the upper into proper relation with the sole as they are sewed.

3. A method of securing shoe-soles to uppers consisting in placing a completely-formed upper with an inturned flange at its bottom in the natural or unturned position in juxtaposition to the sole; sewing the upper directly to the sole and simultaneously utilizing the opening between the upper and the sole immediately in advance of the sewing for guiding the flange of the upper into proper relation with the sole as they are sewed for the major portion of the sewing and completing the sewing without guiding.

4. The method of securing shoe-soles to uppers consisting in placing a completely-formed upper with an inturned flange at its bottom in the natural or unturned position in juxtaposition to the sole, inserting a guide between the sole and upper and progressively guiding the upper onto the sole as the upper is progressively sewed directly to the sole in rear of the guide.

5. The method of securing shoe-soles to uppers consisting in placing a completely-formed upper with an inturned flange at its bottom in the natural or unturned position in juxtaposition to the sole, inserting a guide between tne sole and upper, progressively guiding the upper onto the sole as the upper is progressively sewed directly to the sole in rear of the guide for the major portion of the stitching, and then removing the guide and completing the securing of the sole to the upper.

6. The method of securing shoe-soles to uppers, consisting in placing a completely-formed upper with an inturned flange at its bottom in the natural or unturned position in juxtaposition to the sole, inserting a thread-carrier in the upper in engagement with the flange thereof, and causing a hooked needle to pass through the sole and flange of the upper into engagement with the thread of the carrier, as set forth.

7. The method of securing shoe-soles to uppers, consisting in placing a completely-formed upper with an inturned flange at its bottom in the natural or unturned position in juxtaposition to the sole, interposing a guide between the sole and the flange of the upper, inserting a thread-carrier in the upper in engagement with the flange thereof, and causing a hooked needle to pass through the sole and flange of the upper into engagement with the thread of the carrier, as set forth.

8. The method of securing shoe-soles to uppers, consisting in placing a completely-formed upper with an inturned flange at its bottom in juxtaposition to the sole, interposing a guide between the sole and flange of the upper, inserting a thread-carrier in the upper in engagement with the flange thereof, causing a hooked needle to pass through the sole-guide and flange of upper into engagement with the thread of the carrier for a major portion of the stitches, and then removing the guide and completing the stitching, as set forth.

In testimony whereof I have signed my name to this specification in the presence of two subscribing witnesses.

JOSEPH A. RHOULT.

Witnesses:

CHARLES F. DESPRES,
ADELBERT D. SPRAGUE.